(12) United States Patent
Sanneck et al.

(10) Patent No.: US 10,419,309 B2
(45) Date of Patent: Sep. 17, 2019

(54) SELF ORGANIZING NETWORK OPERATION DIAGNOSIS FUNCTION

(75) Inventors: Henning Sanneck, Munich (DE); Peter Szilagyi, Budapest (HU); Christoph Frenzel, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 49 days.

(21) Appl. No.: 14/419,959

(22) PCT Filed: Aug. 8, 2012

(86) PCT No.: PCT/EP2012/065487
§ 371 (c)(1),
(2), (4) Date: Feb. 6, 2015

(87) PCT Pub. No.: WO2014/023347
PCT Pub. Date: Feb. 13, 2014

(65) Prior Publication Data
US 2015/0188792 A1    Jul. 2, 2015

(51) Int. Cl.
*H04L 12/26* (2006.01)
*H04L 12/24* (2006.01)
(Continued)

(52) U.S. Cl.
CPC ...... *H04L 43/0811* (2013.01); *H04L 41/0645* (2013.01); *H04L 41/0654* (2013.01);
(Continued)

(58) Field of Classification Search
CPC . H04L 43/0811; H04L 41/0672; H04L 43/10; H04L 41/0645; H04L 41/0654;
(Continued)

(56) References Cited

U.S. PATENT DOCUMENTS

| 2010/0299419 | A1 | 11/2010 | Ramankutty et al. |
| 2013/0242720 | A1* | 9/2013 | Chou ................. H04W 52/243 370/221 |

(Continued)

FOREIGN PATENT DOCUMENTS

| CN | 1254992 A | 5/2000 |
| CN | 102077636 A | 5/2011 |

(Continued)

OTHER PUBLICATIONS

3GPP TS 32.522 V10.2.0 (Jun. 2011); 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 10).

(Continued)

*Primary Examiner* — Pao Sinkantarakorn
*Assistant Examiner* — Kabir U Jahangir
(74) *Attorney, Agent, or Firm* — Harrington & Smith

(57) ABSTRACT

While a SON function of a SON system for automated network management in a communication network is operating according to a task assigned to the SON function, when a problem associated with operating according to the task is detected, the problem is indicated to a SON operation diagnosis function of the SON system. The SON operation diagnosis function receives the indication, acquires additional information comprising key performance indicators and operation context, and decides on an action to take based on the indication and the additional information.

14 Claims, 5 Drawing Sheets

(51) Int. Cl.
*H04W 24/04* (2009.01)
*H04W 24/02* (2009.01)

(52) U.S. Cl.
CPC ...... *H04L 41/0672* (2013.01); *H04L 41/0686* (2013.01); *H04L 43/10* (2013.01); *H04W 24/04* (2013.01); *H04W 24/02* (2013.01)

(58) Field of Classification Search
CPC .... H04L 41/0686; H04W 24/04; H04W 24/02
See application file for complete search history.

(56) References Cited

U.S. PATENT DOCUMENTS

| | | | | |
|---|---|---|---|---|
| 2013/0331079 | A1* | 12/2013 | Racz | H04W 24/02 455/418 |
| 2014/0040450 | A1* | 2/2014 | Sanneck | H04L 41/04 709/223 |
| 2014/0337490 | A1* | 11/2014 | Zhao | H04L 41/046 709/220 |
| 2015/0026327 | A1* | 1/2015 | Tang | H04L 41/044 709/223 |
| 2015/0071118 | A1* | 3/2015 | Sanneck | H04L 41/0816 370/255 |
| 2015/0222488 | A1* | 8/2015 | Schmetz | H04W 24/02 370/241.1 |

FOREIGN PATENT DOCUMENTS

| | | |
|---|---|---|
| WO | WO 2005011312 A2 | 2/2005 |
| WO | WO 2010/040417 A1 | 4/2010 |
| WO | WO-2011/050846 A1 | 5/2011 |

OTHER PUBLICATIONS

S. Hämäläinen, et al.; "LTE Self-Organising Networks (SON)—Network Management Automation for Operational Efficiency"; Wiley 2012; pp. 43.

3GPP TS 32.522 V11.2.0 (Jun. 2012), "3$^{rd}$ Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)", 35 pgs.

3GPP TS 32.541 (V10.0.0) (Mar. 2011), "3$^{rd}$ Generation Partnership Project; Technical Specification Group Services and System Aspects; Telecommunication management; Self-Organizing Networks (SON); Self-healing concepts and requirements (Release 10)", 21 pgs.

NEC, "Self Organizing Network, NEC's proposals for next-generation radio network management", Feb. 2009, ©2009 NEC Corporation, 5 pgs.

Hamalainen et al.,"LTE Self-Organizing Networks (SONS), Network Management Automation for Operational Efficiency", Nokia Siemens Networks, (2012), (215 pages).

* cited by examiner

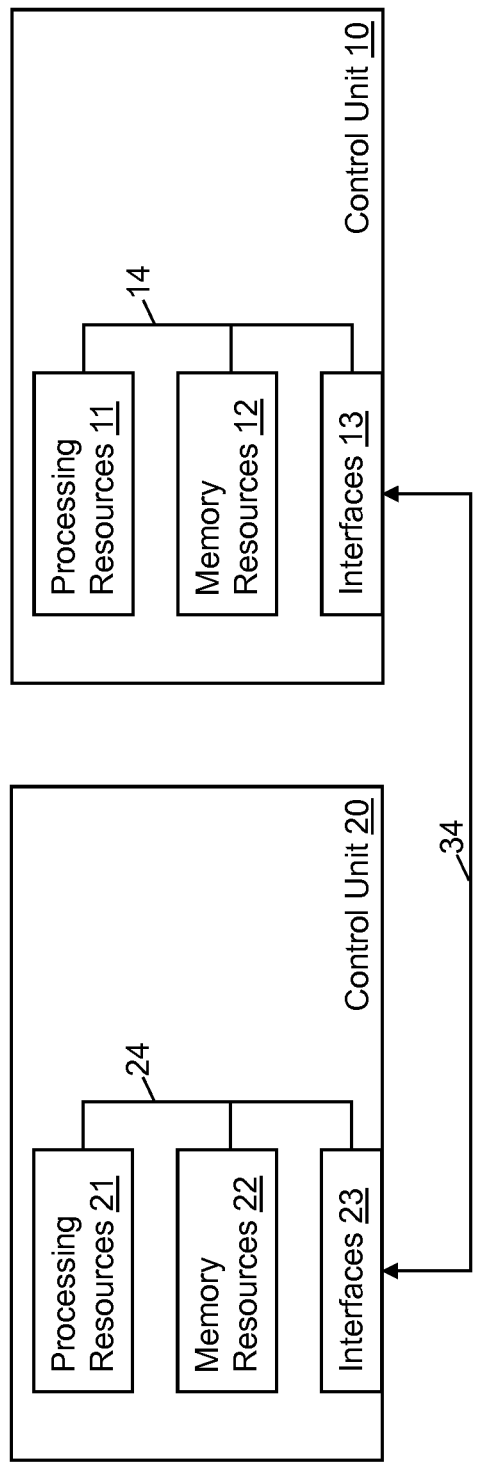

SELF ORGANIZING NETWORK OPERATION DIAGNOSIS FUNCTION

BACKGROUND OF THE INVENTION

Field of the Invention

The present invention relates to a SON-operation diagnosis function.

Related Background Art

Prior art which is related to this technical field can, e.g., be found in:
[1] S. Hämäläinen, H. Sanneck, C. Sartori (eds.), *LTE Self-Organising Networks (SON)-Network Management Automation for Operational Efficiency*, Wiley, 2012.
[2] 3GPP TS 32.541 (2011) Technical Specification Group Services and System Aspects Telecommunication Management, Self-Organizing Networks (SON); Self-healing concepts and requirements, ver. 10.0.0, Release 10, March 2011.
[3] 3GPP TS32.522 (2011) Technical Specification Group Services and System Aspects Telecommunication Management, Self-Organizing Networks (SON) Policy Network Resource Model (NRM) Integration Reference Point (IRP); Information Service (IS), ver.10.2.0, Release 10, 17 Jun. 2011.

The following meanings for the abbreviations used in this specification apply:
3GPP third generation partnership project
CCO cell change order
COC cell outage compensation
COD cell outage detection
COR cell outage-triggered reset
CM configuration management
DM domain management
ESM energy saving management
HO hand over
ICIC inter-cell interference coordination
KPI key performance indicator
LTE long term evolution
LTE-A LTE advanced
MDT minimization of drive tests
MLB mobility load balancing
MRO mobility robustness optimization
NE network element
NM network management
OAM operation, administration and maintenance
PCI physical cell ID
PM performance management
SON self-organizing network
SON-OP SON operation diagnosis function Self-organizing networks (SON, [1]) are seen as a key enabler for automated network management in next generation communication networks such as LTE or LTE-A, as well as multi-radio technology networks known as heterogeneous networks (HetNet). SON areas include self-configuration, which deals with the auto-connectivity and initial configuration of new network elements (such as base stations), and self-optimization, which targets the optimal operation of the network, triggering automatic actions in case the demand for services, user mobility or usual application usability significantly changes that require adjusting network parameters as well as use cases such as energy saving or mobility robustness optimization. These functionalities are complemented by self-healing, which aims at automatic anomaly detection and fault diagnosis.

SON functions are usually designed independently from each other, which means that conflicts may happen between the functions in several ways, in case they are executed on the same (or close) area at the same (or close) time. Preventing or resolving the conflict, i.e., deciding which SON functions have the permission to run while others are blocked is the task of the SON coordination. Some of the conflicts may be prevented by offline analysis covering the monitored inputs and possible parameter reconfigurations of the functions, but indirect dependencies are hard to find.

Although SON use cases are usually classified into one of the above mentioned three SON domains (i.e., configuration, optimization and healing) and all governed at run-time by the described SON coordination entity, there is often not that clear separation between optimization and healing functions. This is because at operation time the trigger for both optimization and healing is the same, i.e., the network operation diverges from its optimum. There is a logic in each SON function that decides whether that use case should be executed, usually realized by monitoring one or more network KPIs as shown in FIG. 1.

In FIG. 1, SON function 1 and SON function 2 monitor network KPIs using a monitoring entity. In case the outcome of the monitoring is that the condition relevant to the function is actually occurring, an algorithm is executed (using an algorithm execution entity) that identifies the actions needed to be carried out to meet the goals of the respective SON function using an action execution entity.

Since the same (or a partially overlapping) set of KPIs may be monitored by different SON functions operating on the same or an adjacent network area, and thus the same network parameters may be adjusted by different SON functions (having of course different goals to achieve), a coordination mechanism between SON use cases is needed to:

(a) determine the conflicting SON functions that should not be executed at the same time on the same target network area (e.g., cells of a radio network);

(b) avoid or preempt the execution of a SON function that cannot meet its goals (e.g., optimization of one or more parameters, compensating for a fault, etc.) and take the appropriate further steps beyond the scope of that particular function.

A particular function's inability to solve its assigned task or achieve a predefined goal may become apparent only during the execution of the function. In case this function may block other functions from executing if it has a higher assigned priority, this could even result in an unusable SON system that is trapped in a deadlock. Also, the mentioned pro-active SON coordination logic (addressing requirement (a) above) does not have the capability/the knowledge to enforce the termination of that function's execution. Furthermore, during its execution, a function may discover additional problems that may render its own operation useless, futile or even counter-productive.

According to the prior art, a concept of a SON coordination framework has been worked out (e.g., [1], chapter 9) that aims at the pro-active identification of conflicts between SON use cases and thus tries to implement requirement (a) as mentioned above.

This is also visible from existing 3GPP use case flow-charts (e.g., for self-healing in 32.541 [2]) where no branch points in the flow and corresponding branches are indicated that specify what happens if a function is not able to realize its goals; it is assumed that once the execution of a function is started, it is going to finish as well with some result.

SUMMARY OF THE INVENTION

The invention aims at overcoming the above drawbacks. In particular, the invention aims at providing a coordination mechanism between SON use cases which also meets requirement (b) mentioned above.

This is at least in part achieved by the methods and apparatuses as defined in the appended claims.

The invention may also be implemented by a computer program product.

According to an embodiment of the invention, a mechanism is provided that is able to escalate an inability of a SON function to solve an assigned task or achieve a predefined goal to a SON operation diagnosis function.

According to an embodiment of the invention, a SON function, a separate function or the SON operation diagnosis function detects when the SON function is not able to meet its goals. In case the execution of a SON function cannot succeed due to circumstances outside of the scope and control of the SON function itself (e.g., due to an ongoing equipment failure), the execution of such function can be blocked (i.e., it should not even be allowed to start) so that it does not block others. In case such functions are already running, these functions can forcibly be terminated to prevent them blocking others from running. Therefore, a preemption capability is provided that is entitled to withdraw the execution right of the function and potentially pass it to some other function.

According to an embodiment of the invention, the SON operation diagnosis function is able to decide on mitigations which may be realized by adapting target settings.

In summary, for fulfilling requirements (a) and (b), additional capabilities are provided in the SON system and in the individual SON functions.

In the following the invention will be described by way of embodiments thereof with reference to the accompanying drawings.

BRIEF DESCRIPTION OF THE DRAWINGS

FIG. 6 shows a schematic block illustrating a configuration of control units in which examples of embodiments of the invention are implementable.

DESCRIPTION OF THE EMBODIMENTS

To address the above-described problem, for a SON system a SON operation diagnosis function (SON-OP) is proposed.

According to a first aspect, the SON-OP establishes the operational state of the SON system (detecting and diagnosing problems) by exploiting the capabilities of SON functions in operation: SON functions are specifically developed to serve a particular goal, e.g., mitigating overload by balancing UEs in a cell cluster or optimizing the coverage vs. capacity. Therefore, they are monitoring a communication network/communication network elements and gather a lot of information. The SON functions are also able to detect specific problems during their execution. For instance, if MRO is not able to improve the call drop rate despite continuous adaptation of HO parameters, it can derive and indicate that there is a coverage hole. This indication can be exploited by the SON-OP. This exploitation can relate to general network conditions, e.g. there is simply a coverage hole due to bad initial network planning, but also to misbehaving/ineffective SON functions, e.g., there is a CCO function causing/contributing to the coverage hole. It is also possible to provide a function different from a SON function for detecting a problem of the SON function and indicating the problem to the SON-OP.

According to a second aspect, the SON-OP can intervene to the execution of SON functions: it can actively trigger or block SON functions based on the received indications. Continuing the previous example, the SON-OP can trigger, e.g., a CCO function to close the diagnosed coverage hole.

Figure 1:
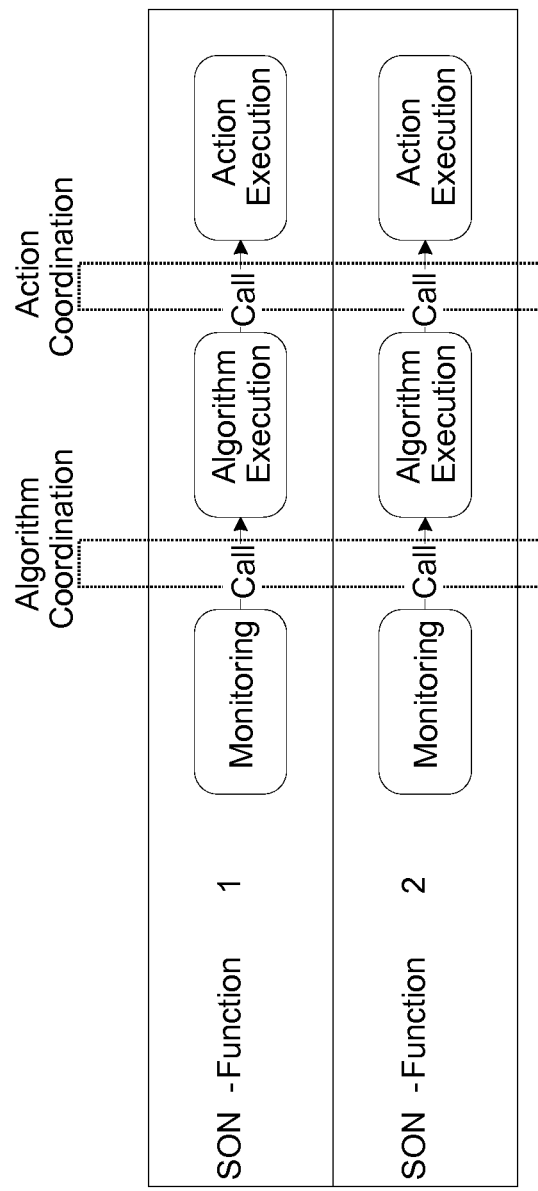
FIG. 1 shows a schematic diagram illustrating SON function parts.
Figure 2:
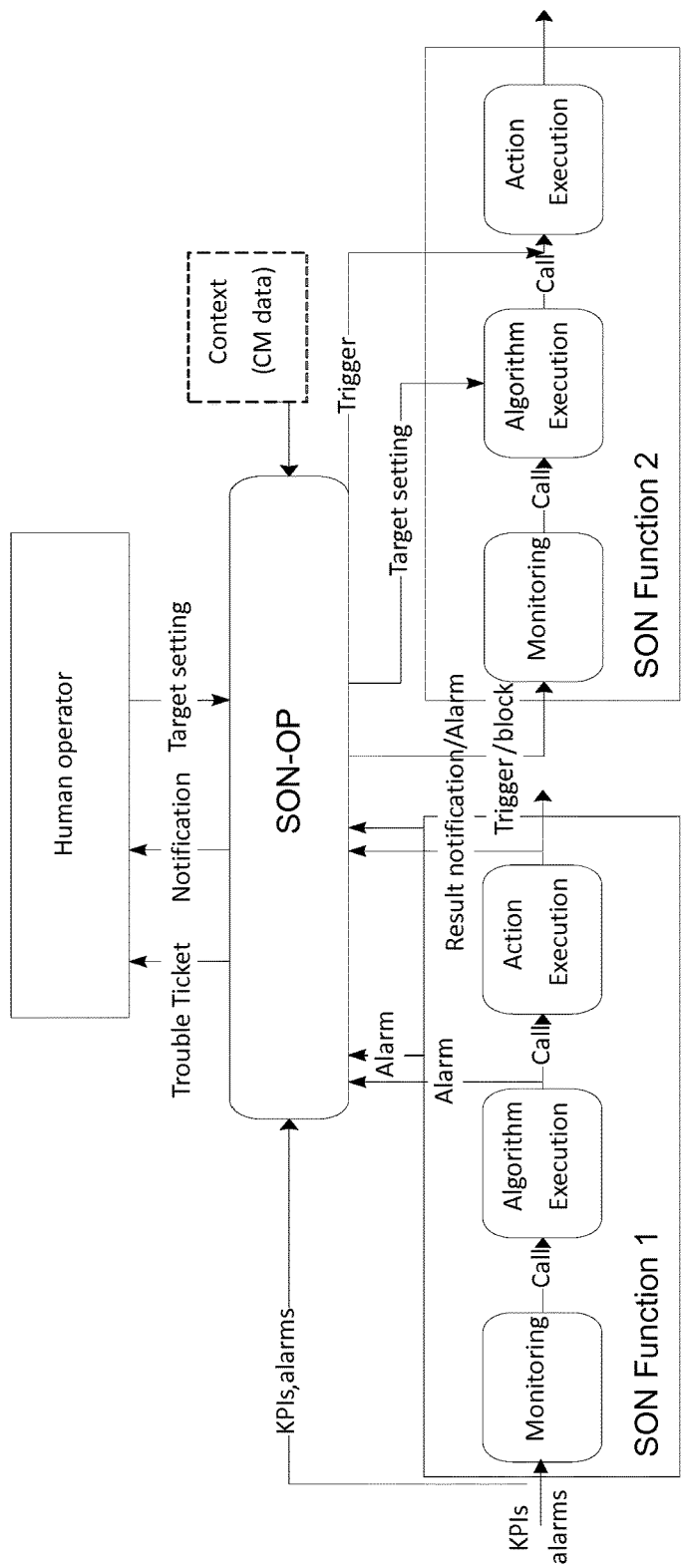
FIG. 2 shows a schematic diagram illustrating a SON-OPeration diagnosis function according to an embodiment of the invention.

FIG. 2 shows a diagram of building blocks and their interactions according to an embodiment of the invention, described in the following.

With respect to the first aspect, each SON function may be extended to have the ability to realize that its goal(s) cannot be met possibly but not necessarily due to external circumstances. It is to be noted that for many SON functions this ability is inherently given due to the level of intelligence of the SON function, however it has been not exploited further up to now. It is also possible to provide a function different from the SON function (separate function) with the ability to detect a problem of the SON function. FIG. 2 shows SON functions 1 and 2, each having a monitoring unit, an algorithm execution unit and an action execution unit. For example, the monitoring unit of SON function 1 monitors network KPIs and alarms to decide whether a use case (a task) should be executed. In case the task should be executed, the algorithm execution unit is called, that identifies the actions required to achieve the task by processing input data like KPIs, CM data and alarms. Finally, the action execution unit is called to execute the identified actions.

Moreover, each SON function may be extended to have a mechanism to indicate a problem to the SON-OP. Those indications can also carry context information for a problem like, e.g., a certainty degree which encodes how certain the SON function is that a problem is really there. It is also possible to provide a function different from the SON function (separate function) with the mechanism to indicate the problem to the SON-OP.

The indication can be implemented:
via extending the regular result notification capability of SON functions (for Itf-N: [3], section 5.6.1);
via the regular alarming capability on Itf-S and/or Itf-N; and
via a specific new notification capability on Itf-S and/or Itf-N.

As shown in FIG. 2, the SON function 1 can indicate an alarm to the SON-OP after processing by the algorithm execution unit and after processing by the action execution unit.

Further, with respect to the first aspect, the SON-OP receives the SON functions' or separate functions' indications. The SON-OP also acquires additional information such as additional KPIs, e.g., system-level KPIs, in particular those which may not be accessible to every SON function or separate function, i.e., higher-level system KPIs, KPIs (e.g., MDT data) which are 'expensive' to acquire and process, and operational context, e.g., CM information and alarm list.

The SON-OP further performs decision making, i.e., reasoning on whether an intervention is necessary and which action to take. The decision making is controlled by expert knowledge which is provided to the SON-OP through simple rules, correlation rules, or probabilistic approaches like fuzzy rules or influence diagrams.

It is to be noted that the SON function continues operation after the indication has been raised, i.e., it behaves completely as if it does not have the indication capability/as if the indication capability is not present. Only the SON-OP may cancel the SON function's operation. The reason for this is that a single function might not be able to ensure that a problem which it cannot handle is really present, as can be seen from the MRO coverage hole example. However, the SON-OP is able to diagnose the problem in more detail because it collects alarms and data from several sources and, thus, can make a more informed decision. The fact that the SON function continues to run after the indication, constitutes an advantageous difference to the regular result notification capability of the SON function.

With respect to the second aspect, the SON-OP enforces the action(s) decided by the SON-OP. This functionality may be implemented, e.g., by either reusing/extending an existing functionality like the SON coordination framework or as a new building block.

The action(s) decided by the SON-OP may be enforced, e.g., by pro-active blocking of a SON-function, by providing a preemption capability to withdraw the execution right from an active SON function, in case of termination or preemption of a SON function, by invoking the next action, e.g., triggering the execution of another SON function), by notifying a human operator/escalating a trouble ticket to the human operator as shown in FIG. 2, and/or by modifying a target setting for SON function(s). Alternatively, the SON-OP may decide to not take any action. For example, in FIG. 2 the SON-OP may trigger or block the SON function 2, especially the monitoring unit of the SON function 2, may change the target setting of the algorithm execution unit, and/or may trigger the action execution unit.

Figure 3:
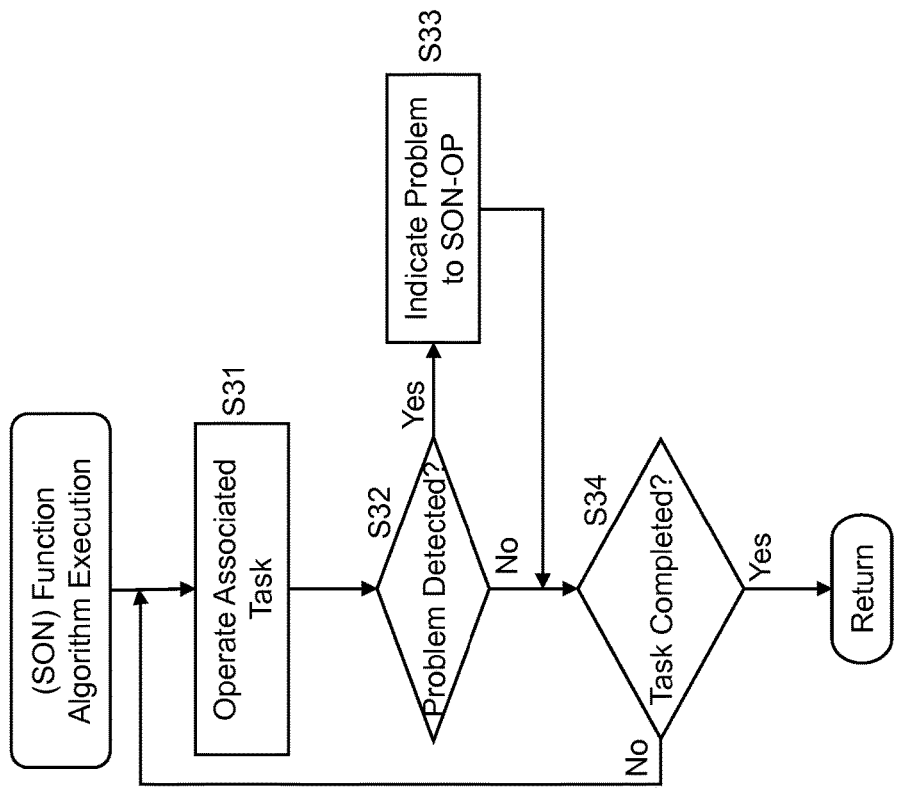
FIG. 3 shows a flow chart illustrating an operation of a SON function according to an embodiment of the invention.

FIG. 3 shows a flowchart illustrating an operation of a (SON) function ((SON) function algorithm execution) of a SON system for automated network management in a communication network, according to an embodiment of the invention.

While the SON function is operating according to a task assigned to the SON function as indicated in step S31, a problem associated with operating according to the task may be detected as indicated in step S32. The problem may be detected by the SON function or a separate function as described above. For example, it may be detected that the task cannot be achieved. Then, in step S33 it is indicated to a SON operation diagnosis function (SON-OP) of the SON system that the task cannot be achieved. This indication may be performed via an extended result notification means of the SON function using interface Itf-N, or an alarming means of the SON function or a separate function using interface Itf-S and/or Itf-N, or a notification means of the SON function or a separate function using the interface Itf_S and/or Itf-N.

Then, similar to when no problem is encountered in step S32, the process advances to step S34 where it is decided if the task is completed or terminated The task may be terminated when the SON function is blocked by the SON-OP or the execution right is withdrawn by the SON-OP from the SON function when active. Alternatively, the SON function may operate according to the task based on a target setting received from the SON-OP. In case the task is completed or terminated, the process ends.

Figure 4:
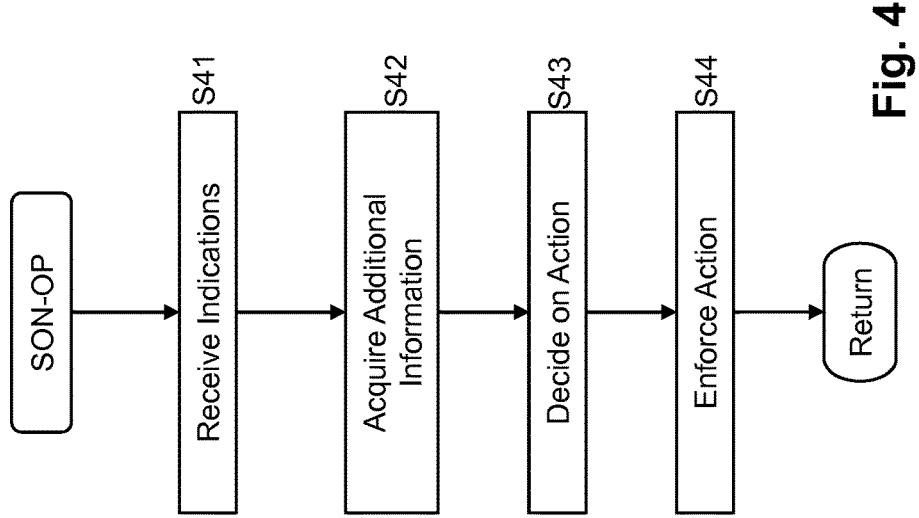
FIG. 4 shows a flow chart illustrating an operation of a SON-OP according to an embodiment of the invention.

FIG. 4 shows a flow chart illustrating operation of the SON-OP according to an embodiment of the invention.

In step S41, the SON-OP receives indications from the SON functions or separate functions as described above that there is a problem with an assigned task. In step S42, the SON-OP acquires additional information comprising key performance indicators and operation context. The key performance indicators may be acquired from a radio access network. In step S43 the SON-OP decides on an action to take based on the indications and the additional information.

In step S44 the SON-OP may enforce the action decided to take by at least one of the following: blocking a SON-function, withdrawing the execution right from an active SON function, in case of termination or preemption of a SON function, invoking the next action, notifying an operator, escalating a trouble ticket, and modifying a target setting for the SON function(s). Alternatively, based on the indications and the additional information, the SON-OP may decide to not take any action.

The SON functions may comprise configuration/energy saving management SON functions, optimization SON functions and healing/troubleshooting SON functions.

The functionality of enforcing the action decided to take may reside in the SON-OP or may be implemented in a SON coordination entity.

Moreover, the SON-OP may be implemented as a SON function, or its functionality may be introduced into the SON coordination entity.

The following table gives examples of use cases which can be realized with SON-OP for intra-area (i.e., within, e.g., self-optimization) and inter-area (e.g., optimization vs. healing) cases.

| triggers/blocks | Configuration/ESM | Optimization | Healing/Troubleshooting |
|---|---|---|---|
| Configuration/ESM | Failure of configuration action in operation (e.g., PCI or ANR, ESM) triggers re-execution of initial auto-connectivity & -commissioning via SON-OP. Failing ANR (two | ANR detects problem (overflow) of NR list, triggers NRO (NR list optimization) or trouble ticket via SON-OP. | Failure of configuration action triggers trouble ticket via SON-OP. |

-continued

| triggers/ blocks | Configuration/ESM | Optimization | Healing/ Troubleshooting |
|---|---|---|---|
| | cells with different ECGI but same PCI) triggers PCI re-allocation via SON-OP. | | |
| Optimization | ICIC discovers a problem in the tilt and power settings and triggers a reset/ readjustment (initial configuration/CCO) via SON-OP. | MRO discovers coverage problem, triggers CCO via SON-OP to solve it MLB discovers that within the given HO parameter range, load balancing is not possible, triggers change of MRO configuration via SON-OP (*) | CCO (or MRO) discovers coverage hole due to wrong dimensioning, triggers trouble ticket via SON-OP. |
| Healing | Failing Cell-Outage-triggered reset triggers re-execution of initial auto-connectivity & -commissioning via SON-OP. | COC triggers CCO for adjacent cell clusters via SON-OP. | COC triggers trouble ticket due to unrecoverable cell outage via SON-OP Sleeping cell detection/diagnosis discovers other problem (shadowing, interference). Other function triggered via SON-OP. |

(*) Mobility Load Balancing (MLB) tries to reduce the load in a cell by relaxing the HO offset towards less loaded neighbor cells.
Given the maximum allowed reduction of the HO offset and the time measured from the reconfiguration of the HO offset, MLB may conclude that it is not able to fulfill its duty if the load is not reduced, despite that the maximum possible HO offset reconfiguration has been utilized and sufficient time has elapsed since then which normally would allow the triggered mechanism to show its result.

According to an embodiment of the invention, opposed to building a completely separate, new function to address the above use cases, functionality may be reused which is already available in SON functions. In this way, existing SON functions are used as probes and detectors which can detect several problems based on their built-in logic. Therefore, the SON-OP does not need to recollect all the KPIs and measurements that the functions gather and re-implement detection capabilities of the functions. As a consequence, the SON-OP does not require to receive the same input data as the individual SON functions but rather relies on the outputs of those functions, thereby reducing the requirements on the processing and network transmission of OAM/SON-related data.

Moreover, existing intelligence (with a limited scope) in SON functions can be complemented with "system-level" intelligence and can therefore address problems which would otherwise go unnoticed or need to be taken care of by a human operator. This contributes to the OPEX savings and quality improvement envisaged with SON.

Further, given 3GPP OAM/SON framework can be matched and relatively minor changes/additions to existing standards are required to realize the SON-OP.

The SON-OP can realize "explicit" workflows, i.e., by embedding the relevant knowledge into SON-OP, the operator can trigger entire workflows based on certain detected conditions/problems in the network in addition to "implicit" workflows where the output of one SON function triggers, as the input for another SON function, the algorithm execution for that function.

It is also possible to avoid unnecessary function executions, e.g., running MRO in a coverage hole area, thereby reducing processing effort.

Figure 5:
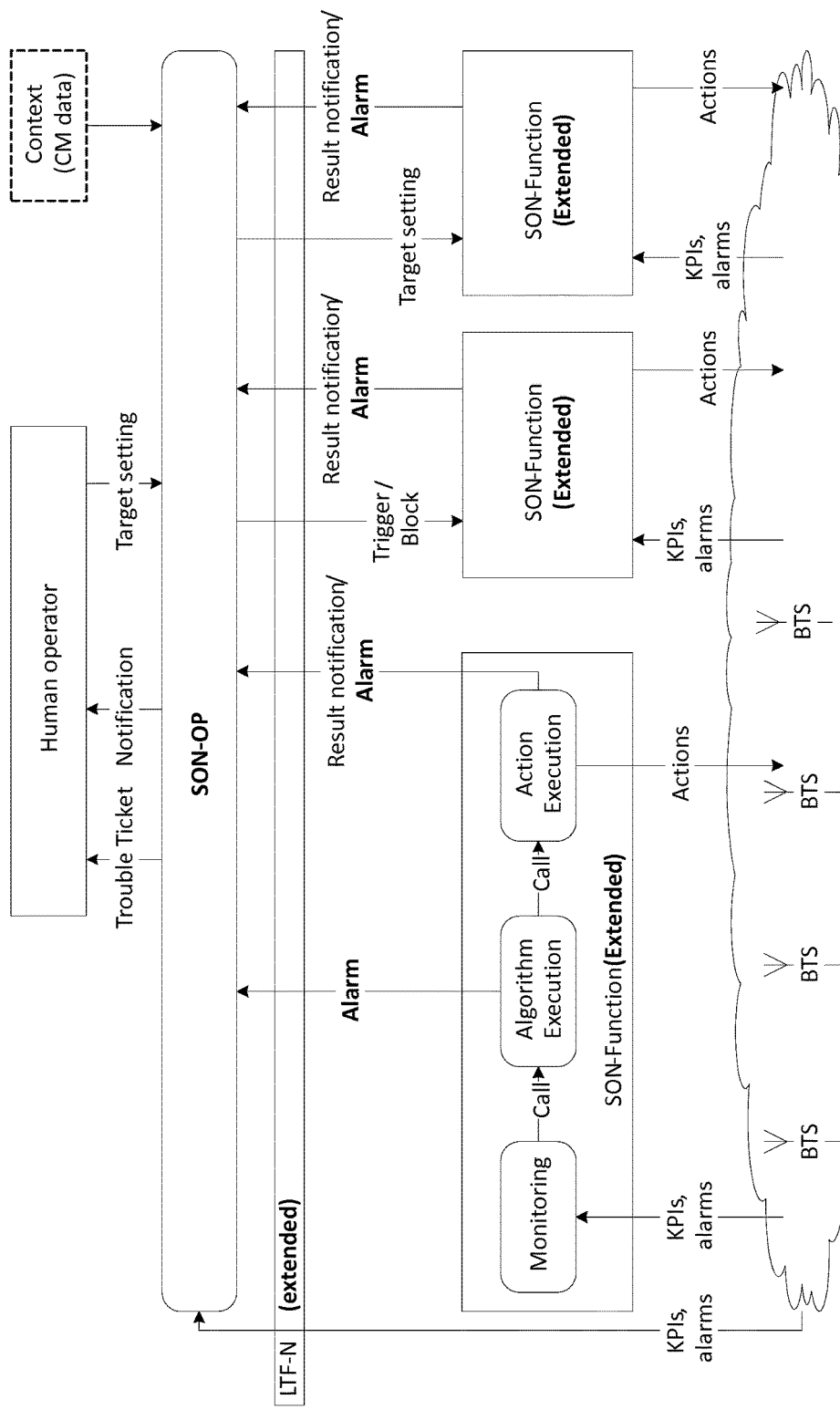
FIG. 5 shows a schematic diagram illustrating a 3GPP OAM/SON system including the SON operation diagnosis function according to an implementation example of the invention.

FIG. 5 depicts a 3GPP OAM/SON system with extensions and additions according to an embodiment of the invention. The extended SON functions (e.g., the monitoring units of the extended SON functions) receive KPIs and alarms from a radio access network comprising a plurality of BTSs, and enforce actions on the radio access network (e.g., the action execution units enforce the actions). The algorithm execution units and the action execution units may indicate an alarm to the SON-OP. The alarm may indicate that the task assigned to the SON function cannot be achieved. The alarm may be indicated via an extended ITF-N interface. The SON-OP may decide on an action to be taken based on the alarm from the SON function and alarms, KPIs from the radio access network and a context. The SON-OP may also perform a target setting according to information received from a human operator, and may send a trouble ticket and/or a notification to the human operator.

The SON-OP may be implemented as part of the SON coordination entity mentioned above. Coordination logic of the SON coordination entity may be extended (e.g., realized in the decision trees) to also incorporate the rules for the SON-OP. Then actions are enforced via the SON coordination entity.

Alternatively, the SON-OP may be implemented as an own SON function as shown in FIG. 5. In this case, the action enforcement by the SON-OP may be implemented such that actions proposed by the SON-OP are performed directly on the SON functions as shown in FIG. 5, e.g., if no SON coordination entity is present. Alternatively, actions are enforced by the SON coordination entity mentioned above. Then a coordination interface of the SON coordination entity needs to be extended to allow a SON function (i.e., SON-OP) to trigger, abort and block other functions and set new targets. In other words, SON-OP requests need to have higher priority than those of any other SON function.

Now reference is made to FIG. 6 for illustrating a simplified block diagram of various electronic devices that are suitable for use in practicing the exemplary embodiments of this invention. A control unit 10 which may be part of or used by a SON function as described above, comprises processing resources 11, memory resources 12 which may store a program and interfaces 13, which are connected by a link 14. A control unit 20 which may be part of or used by a SON-OP as described above, comprises processing resources 21, memory resources 22 which may store a program and interfaces 23, which are connected by a link 24. The control unit 10 and the control unit 20 are connected through a link 34, e.g., an Itf-N or Itf-S interface.

Using its processing resources 11, memory resources 12 and interfaces 13, the control unit 10 may act as the SON function described above, e.g., execute the process shown in FIG. 3. Similarly, using its processing resources 21, memory resources 22 and interfaces 23, the control unit 20 may act as the SON-OP described above, e.g., execute the process shown in FIG. 4.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the programs stored in the memory resources 12, 22 is assumed to include program instructions that, when executed by the associated processing resources 11, 21, enable the electronic device to operate in accordance with the exemplary embodiments of this invention, as detailed above.

In general, the exemplary embodiments of this invention may be implemented by computer software stored in the memory resources 12, 22 and executable by the processing resources 11, 21, or by hardware, or by a combination of software and/or firmware and hardware in any or all of the devices shown.

The memory resources 12, 22 may be of any type suitable to the local technical environment and may be implemented using any suitable data storage technology, such as semiconductor-based memory devices, magnetic memory devices and systems, optical memory devices and systems, fixed memory and removable memory. The processing resources 11, 21 may be of any type suitable to the local technical environment, and may include one or more of general purpose computers, special purpose computers, microprocessors, digital signal processors (DSPs) and processors based on a multi-core processor architecture, as non-limiting examples.

According to an aspect of the invention, an apparatus of a SON system for automated network management in a communication network is provided, which may comprise or use the control unit 10. The apparatus comprises means for, while a SON function of the SON system is operating according to a task assigned to the SON function, detecting a problem associated with operating according to the task, and mean for indicating the problem to a SON operation diagnosis function of the SON system.

The mean for indicating may indicate the problem to the SON operation diagnosis function via an extended result notification means of the SON function using interface Itf-N, or an alarming means using interface Itf-S and/or Itf-N, or a notification means using the interface Itf_S and/or Itf-N.

The apparatus may comprise the SON function and means for terminating the task when the SON function is blocked or the execution right is withdrawn from the SON function when active, by the SON operation diagnosis function, or means for operating according to the task based on a target setting received from the SON operation diagnosis function.

The means for detecting, indicating, terminating and operating may be implemented by the processing resources 11, memory resources 12 and interfaces 13 of the control unit 10.

According to an aspect of the invention, an apparatus comprising a SON function in a SON system for automated network management in a communication network is provided, which may comprise or use the control unit 10. The apparatus comprises means for terminating a task assigned to the SON function when the SON function is blocked or the execution right is withdrawn from the SON function when active, by a SON operation diagnosis function of the SON system, or means for operating according to the task based on a target setting received from the SON operation diagnosis function.

The means for terminating and operating may be implemented by the processing resources 11, memory resources 12 and interfaces 13 of the control unit 10.

According to an aspect of the invention, an apparatus comprising a SON operation diagnosis function of a SON system for automated network management in a mobile communication network is provided, which may comprise or use the control unit 20, the SON system further comprising SON functions each having assigned a respective task. The apparatus comprises means for receiving an indication of a problem associated with operating according to a task, means for acquiring additional information comprising key performance indicators and operation context, and means for deciding on an action to take based on the indication and the additional information.

The apparatus may further comprise means for enforcing the action decided to take by comprising at least one of the following: means for blocking a SON-function, means for withdrawing the execution right from an active SON function, means for, in case of termination or preemption of a SON function, invoking the next action, means for notifying an operator, means for escalating a trouble ticket, and means for modifying a target setting for the SON function(s).

The means for receiving, acquiring, deciding, enforcing, blocking, withdrawing, invoking, notifying, escalating and modifying may be implemented by the processing resources 21, memory resources 22 and interfaces 23 of the control unit 20.

The SON functions may comprise configuration/energy saving management SON functions, optimization SON functions and healing/troubleshooting SON functions.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method executed by a self-organizing network (SON) function in a SON system for automated network management in a communication network, the method comprising:
while the SON function is operating according to a task assigned to the SON function:
detecting by the SON function a problem associated with the SON function operating according to the task;
indicating the problem to a SON operation diagnosis function of the SON system; and
terminating the task when the SON function is blocked by the SON operation diagnosis function, or an execution right is withdrawn by the SON operation diagnosis function, from the SON function when active.

2. The method of claim 1, further comprising:
indicating the problem to the SON operation diagnosis function via one or more of the following:
an extended result notification of the SON function using interface Itf-N;
an alarm using interface Itf-S and/or Itf-N; and
a notification using the interface Itf-S and/or Itf-N.

3. The method of claim 1, wherein the method further comprises operating according to the task, based on a target setting received from a SON operation diagnosis function.

4. A method executed by a self-organizing network (SON) function in a SON system for automated network management in a communication network, the method comprising:
indicating by the SON function a problem to a SON operation diagnosis function of the SON system, the problem associated with the SON function operating according to a task;
terminating the task when the SON-function is blocked by the SON operation, or the execution right is withdrawn, by the SON operation diagnosis function, from the SON function when active, or
operating according to the task based on a target setting received from the SON operation diagnosis function.

5. A method executed by a self-organizing network (SON) operation diagnosis function of a SON system for automated network management in a mobile communication network, the SON system further comprising at least one SON function, each of the at least one SON functions having assigned a respective task, the method comprising:
receiving from one of the at least one SON functions an indication of a problem associated with the one SON function operating according to a task;
acquiring additional information comprising key performance indicators and operation context; and
deciding on an action to take based on the indication and the additional information.

6. The method of claim 5, further comprising:
enforcing the action decided to be taken by performing at least one of the following:
blocking the one SON-function,
withdrawing an execution right from the one SON function,
in case of termination or preemption of the one SON function, invoking a next action,
notifying an operator,
escalating a trouble ticket, and
modifying a target setting for the one SON function.

7. The method of claim 6, wherein the one SON function comprises a configuration/energy saving management SON function, an optimization SON function or a healing/troubleshooting SON function.

8. A computer readable memory storing a program for a processing device, comprising software code portions for performing the steps of claim 1 when the program is run on the processing device.

9. An apparatus of a self-organizing network (SON) system for automated network management in a communication network, said apparatus including a SON function, the apparatus comprising:
at least one processor; and
at least one memory including computer software, the at least one memory and the computer software being configured with the at least one processor, to cause the apparatus to:
while the SON function of the SON system is operating according to a task assigned to the SON function:
detect at the SON function a problem associated with the SON function operating according to the task;
indicate the problem to a SON operation diagnosis function of the SON system; and
terminate the task when the SON function is blocked by the SON operation diagnosis function, or an execution right is withdrawn by the SON operation diagnosis function, from the SON function when active.

10. The apparatus of claim 9, wherein the at least one memory and the computer software are further configured, with the at least one processor, to cause the apparatus to:
indicate the problem to the SON operation diagnosis function via one or more of the following:
an extended result notification of the SON function using interface Itf-N;
an alarm using interface Itf-S and/or Itf-N; and
a notification using the interface Itf-S and/or Itf-N.

11. The apparatus of claim 9, wherein the at least one memory and the computer software are further configured, with the at least one processor, to cause the apparatus to:
operate according to the task based on a target setting received from the SON operation diagnosis function.

12. An apparatus comprising a self-organizing network (SON) function in a SON system for automated network management in a communication network, the apparatus comprising:
at least one processor; and
at least one memory including computer software, the at least one memory and the computer software are configured with the at least one processor, to cause the apparatus to:
indicate by the SON function a problem to a SON operation diagnosis function of the SON system, the problem associated with the SON function operating according to a task;
terminate the task when the SON-function is blocked by the SON operation diagnosis function or an execution right is withdrawn, by the SON operation diagnosis function, from the SON function when active, or
operate according to the task based on a target setting received from the SON operation diagnosis function.

13. An apparatus comprising a self organizing network (SON) operation diagnosis function of a SON system for automated network management in a mobile communication network, the SON system further comprising at least one SON function, each of the at least one SON functions having assigned a respective task, the apparatus comprising:
at least one processor; and at least one memory including computer software, the at least one memory and the computer software are configured with the at least one processor, to cause the apparatus to:

receive from one of the at least one SON functions an indication of a problem associated with the one SON function operating according to a task;

acquire additional information comprising key performance indicators and operation context; and decide on an action to take based on the indication and the additional information.

14. The apparatus of claim 13, wherein the at least one memory and the computer software are further configured, with the at least one processor, to cause the apparatus to:

enforce the action decided to be taken by performing at least one of the following:

block the one SON function, withdraw an execution right from the one SON function, in case of termination or preemption of the one SON function, invoke a next action, notify an operator, escalate a trouble ticket, and modify a target setting for the one SON function.

* * * * *